US012657530B2

(12) United States Patent
Doke et al.

(10) Patent No.: US 12,657,530 B2
(45) Date of Patent: Jun. 16, 2026

(54) METHOD AND SYSTEM FOR SYNTHESIZING CONSTRAINT BASED SMARTPHONE CUE-CARDS FOR SOCIO-TECHNICAL SYSTEM SERVICE DESIGN PROTOTYPING

(71) Applicant: Tata Consultancy Services Limited, Mumbai (IN)

(72) Inventors: Pankaj Doke, Thane (IN); Sujit Raghunath Shinde, Thane (IN); Akhilesh Chandra Srivastava, Thane (IN); Karan Rajesh Bhavsar, Thane (IN); Srinivasu Pappula, Hyderabad (IN); Sanjay Kimbahune, Thane (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 393 days.

(21) Appl. No.: 18/216,056

(22) Filed: Jun. 29, 2023

(65) Prior Publication Data

US 2024/0013108 A1 Jan. 11, 2024

(30) Foreign Application Priority Data

Jul. 8, 2022 (IN) .............................. 202221039419

(51) Int. Cl.
G06Q 10/0631 (2023.01)
G06Q 10/0637 (2023.01)

(52) U.S. Cl.
CPC ................................ G06Q 10/0631 (2013.01)

(58) Field of Classification Search
None
See application file for complete search history.

(56) References Cited

U.S. PATENT DOCUMENTS 7,047,168 B2 * 5/2006 Carballo ................. G06F 30/00
716/132
10,902,162 B2 * 1/2021 Morgan .................. G06F 30/20
(Continued)

FOREIGN PATENT DOCUMENTS

CN 105808249 A 7/2016
CN 106156930 A * 11/2016
(Continued)

OTHER PUBLICATIONS

S. Huet, E. Casseau and O. Pasquier, "Design exploration and HW/SW rapid prototyping for real-time system design," 16th IEEE International Workshop on Rapid System Prototyping (RSP'05), Montreal, QC, Canada, 2005, pp. 240-242 (Year: 2005).*
(Continued)

*Primary Examiner* — Jerry O'Connor
*Assistant Examiner* — Philip N Warner
(74) *Attorney, Agent, or Firm* — FINNEGAN, HENDERSON, FARABOW, GARRETT & DUNNER LLP

(57) ABSTRACT

A method and system for synthesizing smartphone cue-cards representing socio-technical system (STS) service design prototyping based on a plurality of constraints has been provided. The system creates just in time, a dynamic visual design for senior and junior designers for displaying of patterns as digital Cue Cards based on human configured time constraint and novelty constraints all the while avoiding repeatability for the designer. Smartphone is utilized as a mechanism to host multiple cue cards and an interaction model which allows multiple cue-card-connectedness to jump across constraints of local-maxima/minima towards a global-maxima/minima. The method allows young designers get access to better long term memory (LTM) and senior designer getting access to faster LTM. The present disclo-
(Continued)

sure helps senior designer get faster access to new patterns to reduce time for novel new interventions.

10 Claims, 7 Drawing Sheets

(56) References Cited

U.S. PATENT DOCUMENTS

| | | | | |
|---|---|---|---|---|
| 11,586,783 | B2 * | 2/2023 | Martelaro | G06F 30/17 |
| 2009/0246742 | A1 * | 10/2009 | Nadan | A63H 33/38 |
| | | | | 434/128 |
| 2018/0012118 | A1 * | 1/2018 | Catten | G06N 3/006 |
| 2019/0171438 | A1 * | 6/2019 | Franchitti | G06F 8/65 |
| 2020/0019653 | A1 * | 1/2020 | Gajavelly | G06F 30/327 |
| 2020/0134037 | A1 * | 4/2020 | Mankovskii | G06F 40/44 |
| 2021/0173963 | A1 * | 6/2021 | Alaql | G06F 21/75 |
| 2021/0182657 | A1 * | 6/2021 | Markram | G06N 3/044 |
| 2022/0121964 | A1 * | 4/2022 | Ramakrishnan | G06N 5/022 |
| 2022/0207226 | A1 * | 6/2022 | Angiolini | G06F 30/327 |
| 2023/0106385 | A1 * | 4/2023 | Chowdhury | G06Q 10/101 |
| | | | | 705/26.5 |
| 2023/0267396 | A1 * | 8/2023 | Gupta | G06Q 10/0633 |
| 2023/0297741 | A1 * | 9/2023 | Karweta | G06F 30/12 |
| | | | | 703/1 |

FOREIGN PATENT DOCUMENTS

| | | | | | |
|---|---|---|---|---|---|
| CN | 112818620 | A | * | 5/2021 | G06F 30/327 |
| IN | 202121006520 | | | 1/2022 | |

OTHER PUBLICATIONS

Baxter et al., "Socio-technical systems: From design methods to systems engineering," Interacting with Computers, 23:4-17 (2011).

Gacitua-Decar et al., "Automatic Business Process Pattern Matching for Enterprise Services Design," (2009).

Yurtseven et al., "Socio-technical system design: a general systems theory perspective," (2013).

* cited by examiner

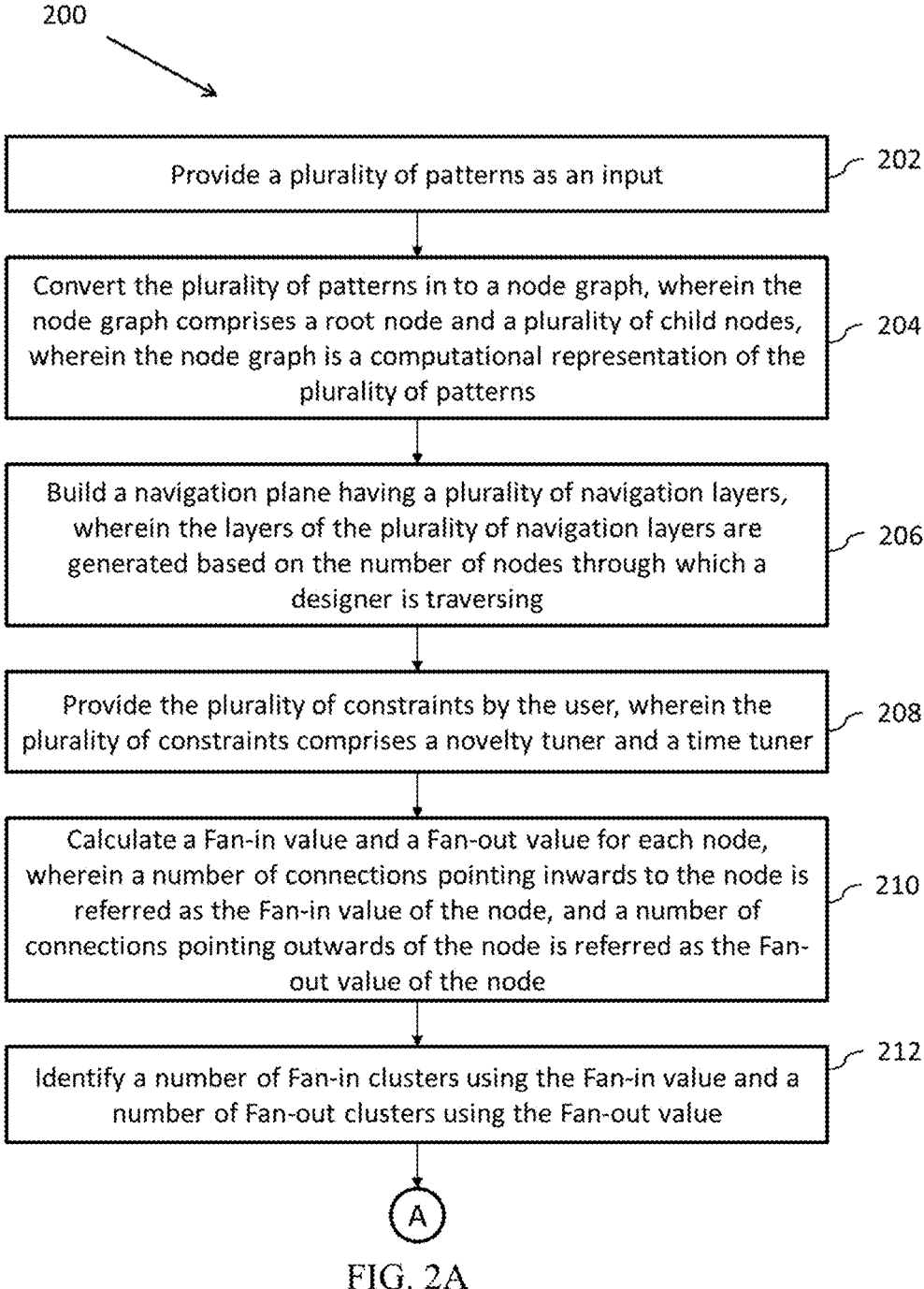

200

Provide a plurality of patterns as an input   202

Convert the plurality of patterns in to a node graph, wherein the node graph comprises a root node and a plurality of child nodes, wherein the node graph is a computational representation of the plurality of patterns   204

Build a navigation plane having a plurality of navigation layers, wherein the layers of the plurality of navigation layers are generated based on the number of nodes through which a designer is traversing   206

Provide the plurality of constraints by the user, wherein the plurality of constraints comprises a novelty tuner and a time tuner   208

Calculate a Fan-in value and a Fan-out value for each node, wherein a number of connections pointing inwards to the node is referred as the Fan-in value of the node, and a number of connections pointing outwards of the node is referred as the Fan-out value of the node   210

Identify a number of Fan-in clusters using the Fan-in value and a number of Fan-out clusters using the Fan-out value   212

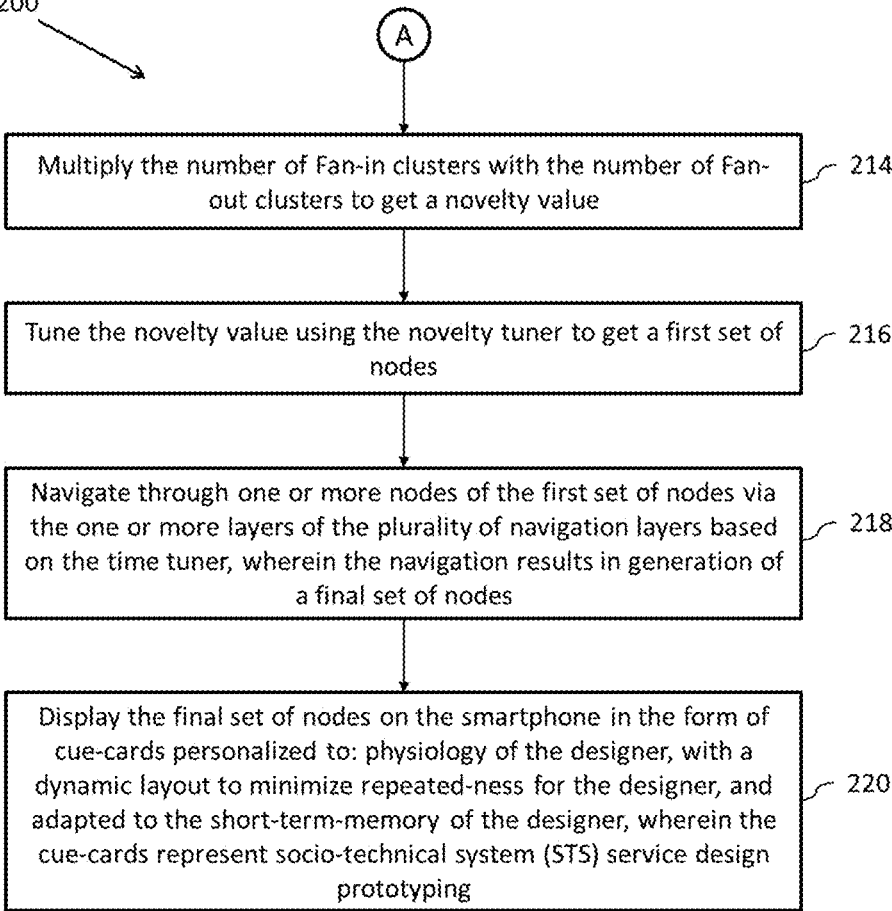

200

A

Multiply the number of Fan-in clusters with the number of Fan-out clusters to get a novelty value — 214

Tune the novelty value using the novelty tuner to get a first set of nodes — 216

Navigate through one or more nodes of the first set of nodes via the one or more layers of the plurality of navigation layers based on the time tuner, wherein the navigation results in generation of a final set of nodes — 218

Display the final set of nodes on the smartphone in the form of cue-cards personalized to: physiology of the designer, with a dynamic layout to minimize repeated-ness for the designer, and adapted to the short-term-memory of the designer, wherein the cue-cards represent socio-technical system (STS) service design prototyping — 220

FIG. 2B

Node Graph Represented in a Linked List (Skip List) Data Structure

| Sorted-Cluster Fan-In | Fan-In | Node | Fan-out | Sort Cluster Fan-Out |
|---|---|---|---|---|
| | 1 | 81 | 1 | |
| | 1 | 82 | 3 | |
| | 1 | 83 | 1 | |
| | 2 | 84 | 2 | |
| | 2 | 85 | 2 | |
| #2 Fan-In Clusters | | | | #3 Fan-Out Clusters |

FIG. 4A

| Cluster Count Fan-In | Cluster Count Fan-Out |
|---|---|
| 2 | 3 |
| | Cluster Fan-In X Cluster Fan out |
| Novelty Value | 6 |

METHOD AND SYSTEM FOR SYNTHESIZING CONSTRAINT BASED SMARTPHONE CUE-CARDS FOR SOCIO-TECHNICAL SYSTEM SERVICE DESIGN PROTOTYPING

PRIORITY CLAIM

This U.S. patent application claims priority under 35 U.S.C. § 119 to: Indian Patent Application No. 202221039419, filed on 8 Jul. 2022. The entire contents of the aforementioned application are incorporated herein by reference.

TECHNICAL FIELD

The disclosure herein generally relates to the field of service design, and, more particularly, to a method and system for synthesizing smartphone cue-cards representing socio-technical system (STS) service design prototyping based on a plurality of constraints.

BACKGROUND

Socio-technical systems (STS) in an organizational development is an approach to achieve complex organizational work design that recognizes the interaction between people and technology in workplaces. STS service is an approach to design that consider human, social and organizational factors, as well as technical factors.

STS service design (SD) is a very common practice now a days. One of the biggest challenges human system designers face with an STS service design is within a given time frame, create something which is novel yet not alien. They typically use patterns to address the problem space from a known solution space.

A pattern is typically described in a structured format containing text and media (photos). Apart from describing the pattern and its context, it also provides a reference to related and connected patterns. However, the challenge they face is the huge number of patterns they have to navigate, assess, remember-recall and have a shared understanding and mutual agreement with fellow designers, i.e. to reach a consensus, backed by data—that the chosen patterns are indeed a good tradeoff between novel and familiar safety—given a plurality of constraint such as budgetary, time, resource, skill etc.

The cognitive problem is that the human short term memory (STM) is limited, it is well known that the STM is constrained to 7+/−2 objects/patterns. The fetching of objects from long term memory (LTM) is time consuming and time is a constraint—also as the designer age and gain experience STM and LTM decay. The designers use STM for immediate near-term exploration and long term memory for global exploration. However, the richness of LTM comes only from age and experience, and there are more young-less-experience designers. Young designers have less LTM, but faster access times and senior designers have richer LTM but weak, slow and error prone access times. Also, as you age, your cognitive abilities face decline and technology adoption becomes a barrier to explore the large digital space of patterns. This further accentuates the problem. Thus, by constraints of human STM and the large connectedness of pattern graph, the current approaches are constrained to steer the designers towards a local maxima/minima their ability to "look beyond" is severely constrained.

One of the mechanisms to deal with this is to use Cue cards. However, in their tangible format—they have the same problem as that of the pattern. The problem is further exacerbated by causing anxiety due to the volume of cards the designers have to deal with. Apart from this Cue cards amplify the locality of the node since a human being can hold at most one card in one hand and this holding of card populates the STM edging-out the other cards from STM. As the user shuffles through various cue cards, after about 3 cue cards, the cross functional team (CFT) or designer has no "back memory" to be able to link to cards in the future. Also, random exploration of the cards is a problem as the search is not directed/targeted towards a goal but is exploratory in nature.

Today, exploration of the pattern space is via print media mostly and in some case digital tools. The pattern catalogue is either in a printed book/catalogue or a digital format like HTML or MDI. However, all of this structuring is still challenging for the human designer. The designer has to spend a significant amount of time familiarizing with all the patterns in a domain as well as domain independent to get a handle on the entire set of patterns. Whether print or digital media—none of this gives the human any advantage beyond navigation or searching for patterns. There are no cognitive aids. There is no structural navigation way for patterns to be discovered and/or assessed for a given constraint of time, skill and novelty.

Further, in STS SD, more designers are involved than one—hence sharing of the rationale of choosing patterns from a catalogue has a challenge. Thus, collaborative pattern selection between group of designer—using print or digital technologies is not easy.

SUMMARY

Embodiments of the present disclosure present technological improvements as solutions to one or more of the above-mentioned technical problems recognized by the inventors in conventional systems. For example, in one embodiment, a system for synthesizing smartphone cue-cards representing socio-technical system (STS) service design prototyping is provided. The system comprises a user interface, one or more hardware processors, and a memory. The user interface provides a plurality of patterns and the plurality of constraints as an input, wherein the plurality of constraints comprises a novelty tuner and a time tuner; The memory is in communication with the one or more hardware processors, wherein the one or more first hardware processors are configured to execute programmed instructions stored in the one or more first memories, to: convert the plurality of patterns in to a node graph, wherein the node graph comprises a root node and a plurality of child nodes, wherein the node graph is a computational representation of the plurality of patterns; build a navigation plane having a plurality of navigation layers, wherein the layers of the plurality of navigation layers are generated based on the number of nodes through which a designer is traversing; calculate a Fan-in value and a Fan-out value for each node, wherein a number of connections pointing inwards to the node is referred as the Fan-in value of the node, and a number of connections pointing outwards of the node is referred as the Fan-out value of the node; identify a number of Fan-in clusters using the Fan-in value and a number of Fan-out clusters using the Fan-out value; multiply the number of Fan-in clusters with the number of Fan-out clusters to get a novelty value; tune the novelty value using the novelty tuner to get a first set of nodes; navigate through one or more nodes of the first set of nodes via the one or more layers of the plurality of navigation layers based on the time tuner, wherein the navigation results in generation of a final set of nodes; and display the final set of nodes on the smartphone in the form of cue-cards personalized to: physiology of the designer, with a dynamic layout to minimize repeated-ness for the designer, and adapted to the short-term-memory of the designer, wherein the cue-cards represent socio-techni-cal system (STS) service design prototyping.

In another aspect, a method for synthesizing smartphone cue-cards representing socio-technical system (STS) service design prototyping is provided. Initially, a plurality of patterns is provided as an input. The plurality of patterns is then converted in to a node graph, wherein the node graph comprises a root node and a plurality of child nodes, wherein the node graph is a computational representation of the plurality of patterns. In the next step a navigation plane is built having a plurality of navigation layers, wherein each of the plurality of navigation layers are generated based on one or more nodes through which a designer is traversing. Further, the plurality of constraints is provided by the user, wherein the plurality of constraints comprises a novelty tuner and a time tuner. Further, a Fan-in value and a Fan-out value is calculated for each node, wherein a number of connections pointing inwards to the node is referred as the Fan-in value of the node, and a number of connections pointing outwards of the node is referred as the Fan-out value of the node. In the next step, a number of Fan-in clusters is identified using the Fan-in value and a number of Fan-out clusters is identified using the Fan-out value. The number of Fan-in clusters is then multiplied with the number of Fan-out clusters to get a novelty value. Further, the novelty value is tuned using the novelty tuner to get a first set of nodes. In the next step navigation is done through one or more nodes of the first set of nodes via the one or more layers of the plurality of navigation layers based on the time tuner, wherein the navigation results in generation of a final set of nodes. And finally, the final set of nodes are displayed on the smartphone in a form of cue-cards personalized to: physiology of the designer, with a dynamic layout to mini-mize repeated-ness for the designer and adapted to the short-term-memory of the designer, wherein the cue-cards represent socio-technical system (STS) service design pro-totyping.

In yet another aspect, one or more non-transitory machine-readable information storage mediums comprising one or more instructions which when executed by one or more hardware processors cause synthesizing smartphone cue-cards representing socio-technical system (STS) service design prototyping is provided. Initially, a plurality of pat-terns is provided as an input. The plurality of patterns is then converted in to a node graph, wherein the node graph comprises a root node and a plurality of child nodes, wherein the node graph is a computational representation of the plurality of patterns. In the next step a navigation plane is built having a plurality of navigation layers, wherein each of the plurality of navigation layers are generated based on one or more nodes through which a designer is traversing. Further, the plurality of constraints is provided by the user, wherein the plurality of constraints comprises a novelty tuner and a time tuner. Further, a Fan-in value and a Fan-out value is calculated for each node, wherein a number of connections pointing inwards to the node is referred as the Fan-in value of the node, and a number of connections pointing outwards of the node is referred as the Fan-out value of the node. In the next step, a number of Fan-in clusters is identified using the Fan-in value and a number of Fan-out clusters is identified using the Fan-out value. The number of Fan-in clusters is then multiplied with the number of Fan-out clusters to get a novelty value. Further, the novelty value is tuned using the novelty tuner to get a first set of nodes. In the next step navigation is done through one or more nodes of the first set of nodes via the one or more layers of the plurality of navigation layers based on the time tuner, wherein the navigation results in generation of a final set of nodes. And finally, the final set of nodes are displayed on the smartphone in a form of cue-cards personalized to: physiology of the designer, with a dynamic layout to mini-mize repeated-ness for the designer and adapted to the short-term-memory of the designer, wherein the cue-cards represent socio-technical system (STS) service design pro-totyping.

It is to be understood that both the foregoing general description and the following detailed description are exem-plary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 2A-2B is a flowchart showing steps involved in the method for synthesizing smartphone cue-cards representing socio-technical system (STS) service design prototyping based on a plurality of constraints according to some embodiments of the present disclosure.

FIG. 4A-4B shows an example of calculation of novelty value according to an embodiment of the present disclosure.

DETAILED DESCRIPTION

Figure 1:
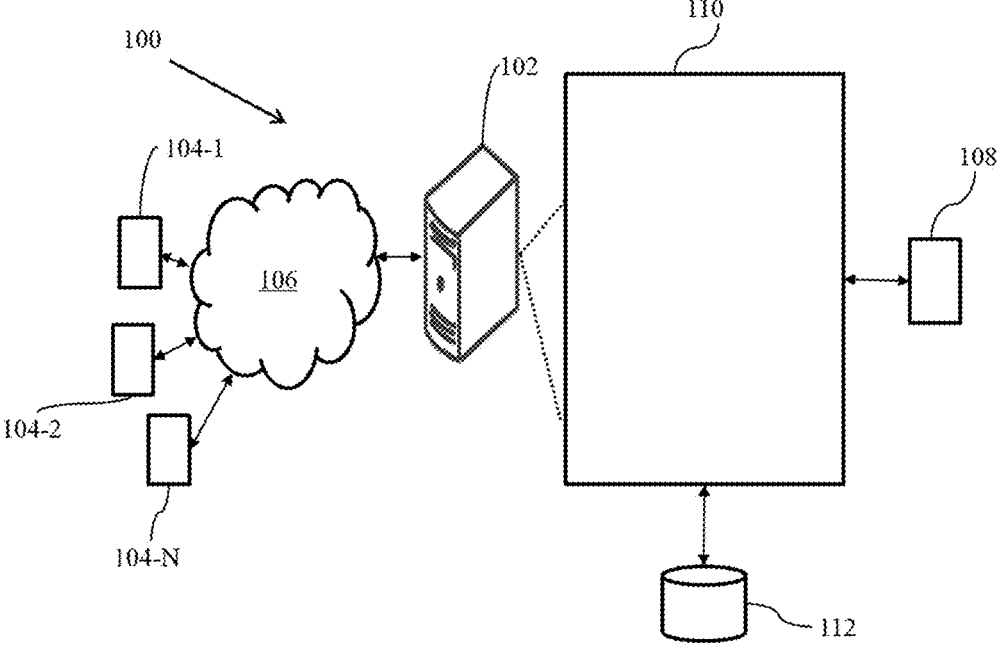
FIG. 1 illustrates a block diagram of a system for syn-thesizing smartphone cue-cards representing socio-technical system (STS) service design prototyping based on a plurality of constraints according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the draw-ings to refer to the same or like parts. While examples and features of disclosed principles are described herein, modi-fications, adaptations, and other implementations are pos-sible without departing from the scope of the disclosed embodiments.

Socio-technical system (STS) service design is an approach to design that consider human, social and organi-zational factors, as well as technical factors. The develop-ment of STS service has identified and attempted to address real problems in understanding and developing complex organizational systems which, nowadays, inevitably rely on large-scale software-intensive systems. By constraints of human short term memory (STM) and the large connectedness of pattern graph, the current approaches are constrained to steer the designers towards a local maxima/minima their ability to "look beyond" is severely constrained.

One of the mechanisms to deal with this is to use Cue cards. However, in their tangible format—they have the same problem as that of the pattern. The problem is further exacerbated by causing anxiety due to the volume of cards the designers have to deal with. As the user shuffles through various cue cards, after about 3 cue cards, the CFT/Designer has no "back memory" to be able to link to cards in the future. Also, random exploration of the cards is a problem as the search is not directed/targeted towards a goal but is exploratory in nature. Another challenge is the repeated-ness of aesthetics which designers face when they are working alone with constraints on access to aesthetics from other designers.

The present disclosure provides a method and system for synthesizing smartphone cue-cards representing socio-technical system (STS) service design prototyping based on a plurality of constraints. The system and method of present disclosure is configured to create just in time, a dynamic visual design for senior and junior designers for displaying of patterns as digital Cue Cards based on human configured time constraint and novelty constraints all the while avoiding repeatability for the designer.

The system and method are configured to utilize a smartphone—whose physical dimensions offer good approximation for physical cue cards and the programmability of the user-interface as a mechanism to host multiple cue cards and an interaction model which allows multiple cue-card-connectedness to jump across constraints of local-maxima/minima towards a global-maxima/minima while keeping the designer within the plurality of constraints. The method allows young designers get access to better long-term memory (LTM) and senior designer getting access to faster LTM and machine aiding their weak STM-LTM with configurable novelty for the solution exploration. The present disclosure helps senior designer get faster access to new patterns to reduce time for novel new interventions.

The present disclosure uses computational approaches to alleviate and use STM to decide the structural layout of the cue card. In other words, using dynamic digital personalized cue cards, and restricting the length of items to explore to nine. As per research in the field of cognitive psychology, the number of objects an average human can hold in short-term memory is 7±2, this is referred as Miller's law. Therefore, in the present case, upper limit of nine has been used. Algorithmically these nine positions are between immediate neighbors (pattern nodes). The neighbors are decided by the tuner—so that explorations of near space and far space is concurrent in nature. The six positions are also balanced based on the designer selected parameter for novelty to affect the weight assigned to long distance nodes. Further, the placement of the cue nodes on the smartphone are automated to dissuade hot spotting from designers—thus enabling novelty in design—in personalized design.

The method is using a Fan-out value of a connected node to create a forward jump list so that exploration of global maxima is achieved more efficiently as compared to a human based efforts. The method also describes a method of configurable novelty of the prototype synthesize by creating a backward jump list of low Fan-out node (and maximum Fan-in) and using their clusters thereby allowing a balance between the old and new, and hence bringing an element of design to the synthesis. In another part, the method discloses automatically structuring the layout of the interface for the designer so that low and high Fan-out node have equiprobable distribution in a 3 row grid, so that the constraints of the STM do not impede the exploration of global maxima.

Further, the present disclosure addresses the challenge of repeated-ness of aesthetics by bringing to front contemporary more popular patterns to the designer in given time constraints. The designers also automate the layout of exploration candidates based on the configured novelty and time constraints. This automatic layout not only programmatically distributes the discovery of novelty and speed but also reduces 'repeated-ness' of design from the same person.

Referring now to the drawings, and more particularly to FIG. 1 through FIG. 6, where similar reference characters denote corresponding features consistently throughout the figures, there are shown preferred embodiments and these embodiments are described in the context of the following exemplary system and/or method.

According to an embodiment of the disclosure, FIG. 1 illustrates a block diagram of a system 100 for synthesizing smartphone cue-cards representing socio-technical system (STS) service design prototyping based on a plurality of constraints. For the sake of clarity, the terms "STS service" or "STS" or "socio-technical system" are interchangeable in the present disclosure. It may be understood that the system 100 comprises one or more computing devices 102, such as a laptop computer, a desktop computer, a notebook, a workstation, a cloud-based computing environment and the like. It will be understood that the system 100 may be accessed through one or more input/output interfaces 104-1, 104-2 . . . , collectively referred to as I/O interface 104 or user interface 104. Examples of the I/O interface 104 may include, but are not limited to, a user interface, a portable computer, a personal digital assistant, a handheld device, a smartphone, a tablet computer, a workstation and the like. The I/O interface 104 are communicatively coupled to the system 100 through a network 106.

In an embodiment, the network 106 may be a wireless or a wired network, or a combination thereof. In an example, the network 106 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 106 may include a variety of network devices, including routers, bridges, servers, computing devices, storage devices. The network devices within the network 106 may interact with the system 100 through communication links.

The system 100 may be implemented in a workstation, a mainframe computer, a server, and a network server. In an embodiment, the computing device 102 further comprises one or more hardware processors 108, one or more memory 110, hereinafter referred as a memory 110 and a data repository 112, for example, a repository 112. The memory 110 is in communication with the one or more hardware processors 108, wherein the one or more hardware processors 108 are configured to execute programmed instructions stored in the memory 110, to perform various functions as explained in the later part of the disclosure. The repository 112 may store data processed, received, and generated by the system 100. The memory 110 further comprises a plurality of units for performing various functions. The plurality of units comprises an.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

FIG. 2A-2B illustrates a flow chart of a method 200 for synthesizing smartphone cue-cards representing socio-technical system (STS) service design prototyping based on a plurality of constraints, in accordance with an example embodiment of the present disclosure. The method 200 depicted in the flow chart may be executed by a system, for example, the system 100 of FIG. 1. In an example embodiment, the system 100 may be embodied in the computing device.

Operations of the flowchart, and combinations of operations in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the flowchart. It will be noted herein that the operations of the method 200 are described with help of system 100. However, the operations of the method 200 can be described and/or practiced by using any other system.

Initially at step 202 of the method 200, the user interface 104 is configured to provide a plurality of patterns as an input. The plurality of patterns could either be in physical media format (books) or in digital media like html pages or in XLS files.

At step 304 of the method 200, the plurality of patterns is converted in to a node graph. The plurality of patterns are the dynamic live patterns generated by the designer, senior and the junior designers. The node graph comprises a root node and a plurality of child nodes, wherein the node graph is a computational representation of the plurality of patterns. Current personnel using the pattern graph are designers from various fields such as finance, sociology, design, engineering, information technology et cetera. On the other hand, personnel charged with the manual synthesis of the pattern graph are design personnel, primarily due to their capability of abstraction and sensitivities towards aesthetics. It is necessary to capture the patterns in the form of graphs. So, the live patterns used by the senior and junior designers are captured in the node graph but, instead of using traditional data structures, they are captured using skip/jump lists.

At step 206 of the method 200, a navigation plane is built. The navigation plane comprises a plurality of navigation layers. The layers of the plurality of navigation layers are generated based on the number of nodes through which a designer is traversing.

At step 208, the plurality of constraints is also provided by the user as the input. The plurality of constraints comprises a novelty tuner and a time tuner. The novelty tuner and the time tuner can also be considered as the novelty constraints and the time constraints respectively.

Further at step 210 of the method 200, a Fan-in value and a Fan-out value is calculated for each node, wherein a number of connections pointing inwards to the particular node is referred as the Fan-in value of that particular node, and a number of connections pointing outwards of the node is referred as the Fan-out value of the node. Each pattern node is embellished with the Fan-in and Fan-out value. The Fan-in and Fan-out values are dynamically updated based on their adoption in the field and are not static values.

At step 212 of the method 200, a number of Fan-in clusters is identified using the Fan-in value and a number of Fan-out clusters is identified using the Fan-out value. At step 214 the number of Fan-in clusters is multiplied with the number of Fan-out clusters to get a novelty value. An example for the calculation of novelty value is shown in FIG. 4.

At step 216, of the method 200, the novelty value is tuned using the novelty tuner to get a first set of nodes. At step 218, the first set of nodes are then navigated through one or more nodes of the first set of nodes via the one or more layers of the plurality of navigation layers based on the time tuner. The navigation results in generation of a final set of nodes.

And finally, at step 218 of the method 200, the final set of nodes is displayed on the smartphone in the form of cue-cards personalized to: physiology of the designer, with a dynamic layout to minimize repeated-ness for the designer and adapted to the short-term-memory of the designer, wherein the cue-cards represent socio-technical system (STS) service design prototyping.

This abstract data structure, which was taken as input in terms of the plurality of patterns, is presented on a smart phone as a visual design based on configurable values of novelty and time constraint which are chosen by the designer. The layout of presentation of this information on the screen is then based on the execution of certain steps.

Figure 3:
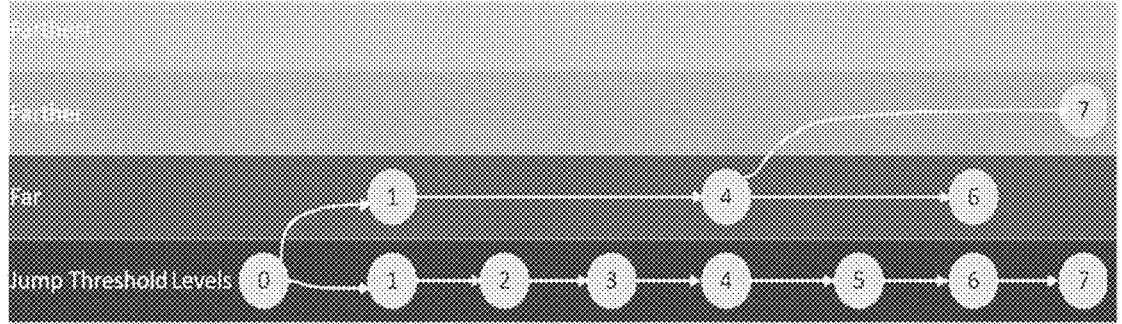
FIG. 3 shows an example node graph represented in a skip list data structure according to some embodiment of the present disclosure.

According to an embodiment of the disclosure the time tuner based navigation is explained as follows. The time tuner is used for automating the speed-exploration of far-away nodes for faster prototype synthesis. FIG. 3 shows an example for creating on the fly (just in time) navigation layer using the underlying construct of the pattern graph which is a storage construct. Given a storage graph, the navigation layer, the Fan-in value and the Fan-out value is computed per node. It then creates a multi-level navigation layer as depicted in an example of FIG. 3. The 3 levels far-farther-farthest are exemplary and can be further increased in proportion to the connectedness of the node graph. The time tuner can be set to normal-fast-fastest. Based on this, the set of nodes from the sorted-cluster-list are picked. Each cluster has a set of nodes which the same Fan-in value (Fan-out value). This sorted cluster linked list is mapped to the time tuner. Based on the value chosen from the time tuner, the nodes in this list are selected as depicted in the FIG. 3. At the particular level, the subsequent navigation in then breadth-first (that is amongst all those nodes with the same value of Fan-out (Fan-in)). Such a skip list structures allows faster discovery of prominent nodes (as well as their peers) when time is a constraint. Similarly, on the reverse spectrum, when time is not a constraint, the graph is traversed breath-first for all the nodes.

According to an embodiment of the disclosure, the novelty tuner is configured to set the novelty. The node graph representing the patterns is traversed to compute the Fan-in value and the Fan-out value per node. The Fan-in is defined as the number of nodes pointing towards a node and Fan-out is the number of nodes the current node is pointing to. The cluster is defined as a set which has those nodes whose Fan-in value or Fan-out value is the same count. And a novelty value is defined as the product of number of clusters. Thus, as the cluster count increases the novelty value increases since many clusters can now connect to each other in a combinatorial manner. This can be depicted with the help of an example scenario as shown in FIG. 4A and FIG. 4B. Thus, based on the criteria set for novelty (high, medium, low). Based on the value chosen, a particular cluster is then chosen whose constituent nodes became the candidate nodes to be considered by the navigation layer (which is constructed on the fly/just in time}. In other words, based on the novelty tuner the navigation layer filters nodes from the storage layer and choses only those which meet the criteria to be used in constructing the navigation layer based cue cards.

Figure 5:
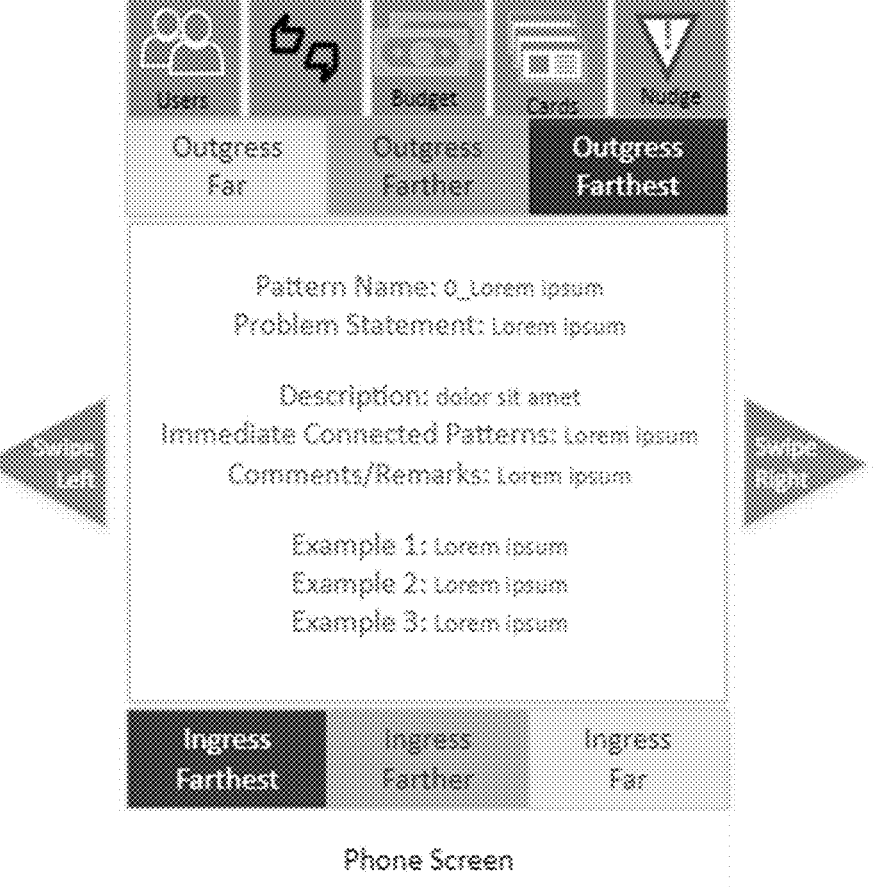
FIG. 5 shows a display screen of a smartphone having example data according to some embodiments of the present disclosure.

According to an embodiment of the disclosure, the system 100 is configured to design a personalized layout on the display screen of the designer. FIG. 5 depicts an example scenario of the visual layout of the Cue card. In the present example scenario, the figure depicts 3 slots at the top and 3 slots at the bottom. These are placed holders for the nodes which would be populated from the navigation structure candidate set based on the values set for the novelty and the time. Given a particular set of 3 nodes for the top slot and 3 nodes for the bottom slots, the actual location is defined based on the product of probability of forward slot (1/2/3) and probability of node (3/2/1).

The probability of a node is computed as the frequency of usage by a given user/designer. Normally, the physiology of the user is having a higher probability for fs (1) (top left corner). Thus, the higher probability node is multiplied by the lower probability node, and then the multiplication is taken as the probability of node (3) is placed here. Similarly, the higher probability node probability of node (1) is placed in forward slot (3). All nodes are initialized to the same fixed value at the very first usage. After every usage, the probability of a node is computed from the normalized frequency count.

Figure 6:
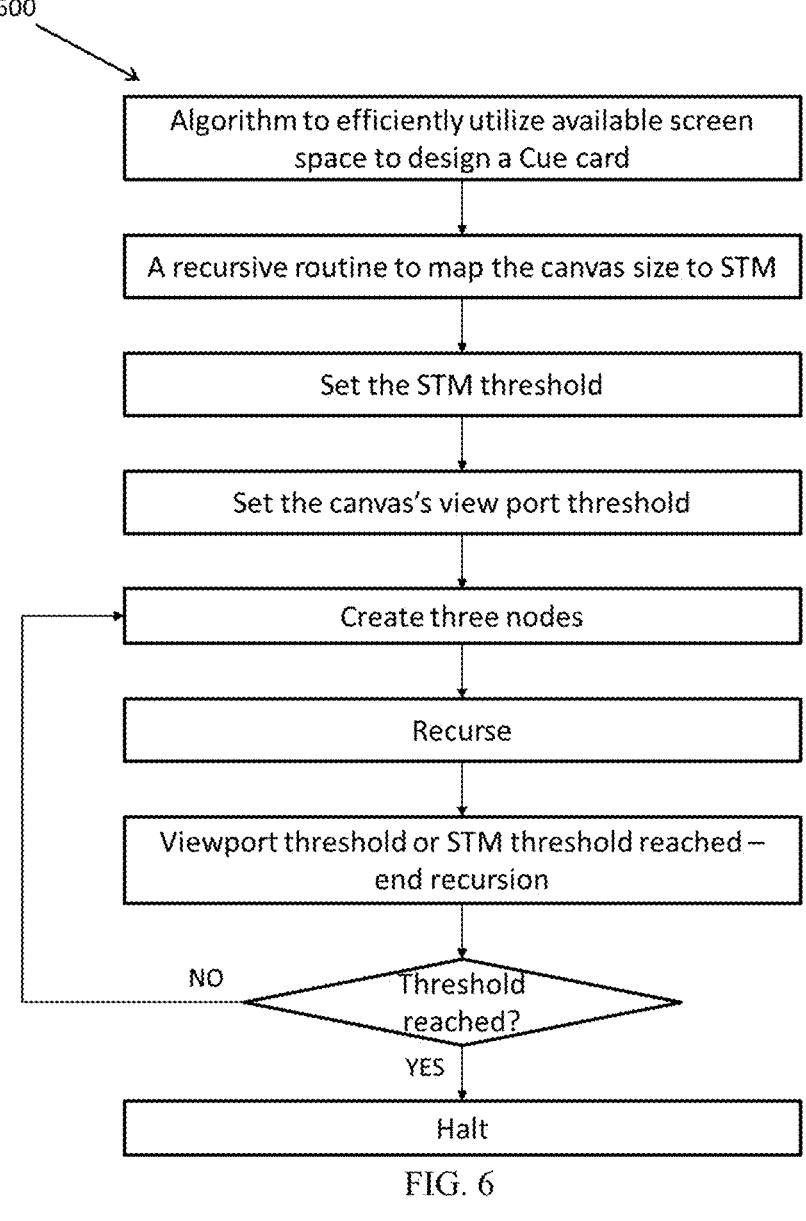
FIG. 6 is a flowchart showing steps involved in efficiently utilizing available display screen space to design a Cue card according to some embodiments of the present disclosure.

According to an embodiment of the disclosure, the system 100 is also configured to balance the design by auto-splitting the STM into structural layouts as shown in the flowchart 600 of the FIG. 6. One of the core components of any design is balance—balance between different components. The present disclosure shares three node tree structure. The root node comprises the entire canvas of the smartphone. This root node has three child nodes. The left child (lc) is automatically lays out on the top when the device is in portrait mode, the right child lays out at the footer/bottom and the middle child lays out in the center of the screen. This three node structure is then recursed further for the top/header, center space and the footer. Thus, a depth two, 3-child node tree is present. This structure is an optimal balance between information entropy (the data elements to be presented) and the STM of the user. The STM of the user as per cognitive theory is 7+−2 as per miller. Thus, automatically splitting the STM (7+−2) into a depth two, 3-node structure, balance of the elements is structurally maintained.

Further, at each level—at the header and footer—further balancing of the solution discovery is done by selection of high Fan-out nodes in the header and high Fan-in nodes in the footer.

Thus, using the computational split of STM into a structural layout for content layout, balance to the synthesis of solution is brought. After an initial duration of six months, the user is re-administered the STM memory test and the values are recomputed to update the number of child nodes from the root node and thereafter in a recursive manner. Thus, the layout is continuously updated to reflect the individual user's STM capabilities.

According to an embodiment of the disclosure, an example of display screen with various possibilities is provided below. The display area is captured in a tree construct with the root Node R, having 3 child nodes, Left (L), Center (C) and right (R). L further has 3 child nodes, FS1, FS2, FS3 (forward screen). C has only 1 node CC. R has 3 child nodes, BS1, BS2, BS3 (backward screen). In the default setting, of large time and large novelty are the default settings. Based on this FS1-3 and BS1-3 are populated with those nodes which have a shorter distance/weight from the current node. These then effectively move to the designer's STM. Now, if the designer team change the value of time and novelty, then the nodes in FS1 are picked from Jump (FS1) or Jump (JumpFS1) or Jump (Jump (JumpFS1)) as the case maybe and similarly for BS1/2/3.

The selected cards/nodes are then accumulated in a stack which is visible to the design team for upvoting and selection. The selected stack of cards/nodes also has a traceability of navigation to study the criteria for selection. Right swipe takes to the next node/card. The selected cards/nodes in the stack are then used to generate the service blueprint and the Fan-in and Fan-out are updated in the node graph to reflect the newly synthesized service. Those cards/nodes which get consistently shortlisted by the same designer have their repeated index increased. This weight is then used to display a nudge at C to visually indicate the sameness/repeated-ness of design by the designer also shortlisting this card/node by the designer decreases the novelty metric of the Blueprint which is computed from the stack of selected cards. The novelty metric is also balanced by weighing the score with the values from BS1-2-3. This ensures a balance of novelty vis a vis familiarity and totally unknown. It also lowers the dominances of nodes with higher Fan-in values giving rise to repeated designs.

Further layout of nodes within FS1-2-3 is automated based on the physiology of the hand of the designer as well as selection probability of the locations. So, if P(Na)> P(Nb)>P(Nc) and P(FS1)>P(FS2)>P(FS3) for a given User, then machine pairs (Na, FS3), (Nb, FS2) and (Nc, FS1) so that the nodes are now equiprobable in the hands of an identified designer, where Na, Nb, and Nc are pattern nodes, and refer Node A, Node B and Node C respectively.

Based on the values set in the threshold for time and novelty, the 'Next' node for a given slot are then either set to Jump (Current Node) or Jump (Jump ( )) or Jump (Jump (Jump ( ))) so on and so forth.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem related to designing STS service given a plurality of constraint such as budgetary, time, resource, skill etc. The embodiment thus provides a method and a system for synthesizing smartphone cue-cards representing socio-technical system (STS) service design prototyping based on a plurality of constraints such as time and novelty constraints.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for synthesizing smartphone cue-cards representing socio-technical system (STS) service design prototyping, the processor implemented method comprising steps of:

providing, via one or more hardware processors, a plurality of patterns as an input;

converting, via the one or more hardware processors, the plurality of patterns in to a node graph, wherein the plurality of patterns are dynamic live patterns generated by a designer, wherein the node graph comprises a root node and a plurality of child nodes, wherein the node graph is a computational representation of the plurality of patterns;

building, via the one or more hardware processors, a navigation plane having a plurality of navigation layers, wherein each of the plurality of navigation layers are generated based on one or more nodes through which a designer is traversing;

providing, via the one or more hardware processors, the plurality of constraints by the user, wherein the plurality of constraints comprises a novelty tuner and a time tuner;

calculating, via the one or more hardware processors, a Fan-in value and a Fan-out value for each node, wherein a number of connections pointing inwards to the node is referred as the Fan-in value of the node, and a number of connections pointing outwards of the node is referred as the Fan-out value of the node;

identifying, via the one or more hardware processors, a number of Fan-in clusters using the Fan-in value and a number of Fan-out clusters using the Fan-out value, wherein the Fan-in value and Fan-out value are dynamically updated based on field adoption;

multiplying, via the one or more hardware processors, the number of Fan-in clusters with the number of Fan-out clusters to get a novelty value;

tuning, via the one or more hardware processors, the novelty value using the novelty tuner to get a first set of nodes;

navigating, via the one or more hardware processors, through one or more nodes of the first set of nodes via the one or more layers of the plurality of navigation layers based on the time tuner, wherein the navigation results in generation of a final set of nodes, wherein the time tuner is set to normal-fast-fastest and the first set of nodes are selected from a sorted cluster-list, and wherein the sorted cluster-list is mapped to the time tuner; and displaying, via the one or more hardware processors, the final set of nodes on the smartphone in a form of cue-cards personalized to:

physiology of the designer, with a dynamic layout to minimize repeated-ness for the designer, and adapted to the short-term-memory of the designer, wherein the cue-cards represent socio-technical system (STS) service design prototyping, wherein each of the cue-cards comprises a predefined number of nodes decided based on cognitive psychology of the designer, wherein the displaying of the final set of nodes further comprises:

defining a plurality of slots, wherein the plurality of slots comprise a first plurality of slots at a top of a screen of the smartphone and a second plurality of slots at a bottom of the screen of the smartphone, wherein the first plurality of slots and the second plurality of slots are place holders for the nodes which are populated from a navigation structure candidate set based on the values set of the novelty and the time; and defining an actual location of the cue-cards based on a product of probability of forward slot and probability of the node, wherein a probability of the node is computed as the frequency of usage by the designer;

selecting a stack of cards or nodes having traceability of navigation, wherein the selected stack of cards or nodes generates service blueprints and the node graph are updated using the Fan-in and Fan-out to reflect the newly synthesized service.

2. The processor implemented method of claim 1, wherein the novelty value indicates clusters connected to each other in a combinatorial manner.

3. The processor implemented method of claim 1 wherein the plurality of patterns is present one or more of a physical format or a digital format.

4. The processor implemented method of claim 1 further comprising balancing a design of the cue-cards by splitting a short term memory of the designer in to structural layout of a depth two, 3-node tree structure, wherein a root node comprises an entire canvas of the smartphone and the root node includes three child nodes wherein a left child is automatically lays out on a top when the smartphone is in a portrait mode, a right child lays out at a footer or bottom and a middle child lays out in a center of a screen, wherein the depth two, 3-node tree structure is recursed further for the top or header, center space and the footer.

5. The processor implemented method of claim 1, wherein the navigation layer filters nodes from a storage layer based on the novelty tuner and selects the nodes meeting the criteria to be used in constructing the navigation layer based on the cue cards.

6. A system for synthesizing smartphone cue-cards representing socio-technical system (STS) service design prototyping, the system comprises:

a user interface for providing a plurality of patterns and the plurality of constraints as an input, wherein the plurality of constraints comprises a novelty tuner and a time tuner;

one or more hardware processors;

a memory in communication with the one or more hardware processors, wherein the one or more first hardware processors are configured to execute programmed instructions stored in the one or more first memories, to:

convert the plurality of patterns in to a node graph, wherein the plurality of patterns are dynamic live patterns generated by a designer, wherein the node graph comprises a root node and a plurality of child nodes, wherein the node graph is a computational representation of the plurality of patterns;

build a navigation plane having a plurality of navigation layers, wherein the layers of the plurality of navigation layers are generated based on the number of nodes through which a designer is traversing;

calculate a Fan-in value and a Fan-out value for each node, wherein a number of connections pointing inwards to the node is referred as the Fan-in value of the node, and a number of connections pointing outwards of the node is referred as the Fan-out value of the node;

identify a number of Fan-in clusters using the Fan-in value and a number of Fan-out clusters using the Fan-out value, wherein the Fan-in and Fan-out values are dynamically updated based on field adoption;

multiply the number of Fan-in clusters with the number of Fan-out clusters to get a novelty value;

tune the novelty value using the novelty tuner to get a first set of nodes;

navigate through one or more nodes of the first set of nodes via the one or more layers of the plurality of navigation layers based on the time tuner, wherein the navigation results in generation of a final set of nodes, wherein the time tuner is set to normal-fast-fastest and the first set of nodes are selected from a sorted cluster-list, wherein the sorted cluster-list is mapped to the time tuner; and display the final set of nodes on the smartphone in the form of cue-cards personalized to:

physiology of the designer, with a dynamic layout to minimize repeated-ness for the designer, and adapted to the short-term-memory of the designer, wherein the cue-cards represent socio-technical system (STS) service design prototyping, wherein each of the cue-cards comprises a predefined number of nodes decided based on cognitive psychology of the designer, wherein the displaying of the final set of nodes further comprises:

define a plurality of slots, wherein the plurality of slots comprise a first plurality of slots at a top of a screen of the smartphone and a second plurality of slots at a bottom of the screen of the smartphone, wherein the first plurality of slots and the second plurality of slots are place holders for the nodes which are populated from a navigation structure candidate set based on the values set of the novelty and the time; and define an actual location of the cue-cards based on a product of probability of forward slot and probability of the node, wherein a probability of the node is computed as the frequency of usage by the designer;

select a stack of cards or nodes having traceability of navigation, wherein the selected stack of cards or nodes generates service blueprints and the node graph are updated using the Fan-in and Fan-out to reflect the newly synthesized service.

7. The system of claim 6, wherein the novelty value indicates clusters connected to each other in a combinatorial manner.

8. The system of claim 6, wherein the plurality of patterns is present in one or more of a physical format or a digital format.

9. The system of claim 6 further comprising balancing a design of the cue-cards by splitting a short term memory of the designer in to structural layout.

10. One or more non-transitory machine-readable information storage mediums comprising one or more instructions which when executed by one or more hardware processors cause:

providing, via one or more hardware processors, a plurality of patterns as an input;

converting, via the one or more hardware processors, the plurality of patterns into a node graph, wherein the plurality of patterns are dynamic live patterns generated by a designer, wherein the node graph comprises a root node and a plurality of child nodes, wherein the node graph is a computational representation of the plurality of patterns;

building, via the one or more hardware processors, a navigation plane having a plurality of navigation layers, wherein each of the plurality of navigation layers are generated based on one or more nodes through which a designer is traversing;

providing, via the one or more hardware processors, the plurality of constraints by the user, wherein the plurality of constraints comprises a novelty tuner and a time tuner;

calculating, via the one or more hardware processors, a Fan-in value and a Fan-out value for each node, wherein a number of connections pointing inwards to the node is referred as the Fan-in value of the node, and a number of connections pointing outwards of the node is referred as the Fan-out value of the node;

identifying, via the one or more hardware processors, a number of Fan-in clusters using the Fan-in value and a number of Fan-out clusters using the Fan-out value, wherein the Fan-in value and Fan-out value are dynamically updated based on field adoption;

multiplying, via the one or more hardware processors, the number of Fan-in clusters with the number of Fan-out clusters to get a novelty value;

tuning, via the one or more hardware processors, the novelty value using the novelty tuner to get a first set of nodes;

navigating, via the one or more hardware processors, through one or more nodes of the first set of nodes via the one or more layers of the plurality of navigation layers based on the time tuner, wherein the navigation results in generation of a final set of nodes, wherein the time tuner is set to normal-fast-fastest and the first set of nodes are selected from a sorted cluster-list, wherein the sorted cluster-list is mapped to the time tuner; and displaying, via the one or more hardware processors, the final set of nodes on the smartphone in a form of cue-cards personalized to:

physiology of the designer, with a dynamic layout to minimize repeated-ness for the designer, and adapted to the short-term-memory of the designer, wherein the cue-cards represent socio-technical system (STS) service design prototyping, wherein each of the cue-cards comprises a predefined number of nodes decided based on cognitive psychology of the designer, wherein the displaying of the final set of nodes further comprises:

defining a plurality of slots, wherein the plurality of slots comprise a first plurality of slots at a top of a screen of the smartphone and a second plurality of slots at a bottom of the screen of the smartphone, wherein the first plurality of slots and the second plurality of slots are place holders for the nodes which are populated from a navigation structure candidate set based on the values set of the novelty and the time; and defining an actual location of the cue-cards based on a product of probability of forward slot and probability of the node, wherein a probability of the node is computed as the frequency of usage by the designer;

selecting a stack of cards or nodes having traceability of navigation, wherein the selected stack of cards or nodes generates service blueprints and the node graph are updated using the Fan-in and Fan-out to reflect the newly synthesized service.

* * * * *